United States Patent Office 3,449,487
Patented June 10, 1969

3,449,487
PROCESS FOR PRODUCING A MOLDED POLYMETHYL METHACRYLATE ARTICLE HAVING WHITE PIGMENT DISPERSED THEREIN FOR USE AS A SECONDARY STANDARD FOR REFLECTION MEASUREMENTS
Leopoldo A. Micco, Fullerton, Calif., and Donald P. Jones, Port Dickinson, N.Y., assignors to GAF Corporation, New York, N.Y., a corporation of Delaware
No Drawing. Continuation-in-part of application Ser. No. 717,875, Feb. 27, 1958. This application Sept. 5, 1962, Ser. No. 221,438
Int. Cl. B29c 21/00; B29f 5/00
U.S. Cl. 264—140        4 Claims

ABSTRACT OF THE DISCLOSURE

Process for producing a molded polymethyl methacrylate body having a white pigment uniformly dispersed therein, by dispersing the pigment in a solution of the polymer in a non-aqueous solvent, coagulating by pouring into hot water and drying, pulverizing and pressure molding the resulting coagulated product.

---

This application is a continuation-in-part of our copending application Ser. No. 717,875, filed Feb. 27, 1958, and now abandoned.

This invention relates to the manufacture of materials used in the measurement of reflectance.

The need for the quality control of colored products, which involves the use of reflectance measurements by comparison with established standards, has in recent years become increasingly acute. In these measurements, it has been found necessary that the primary reflectance standards, namely, magnesium carbonate and magnesium oxide, be used in freshly prepared form. Both the magnesium carbonate, which is obtained by precipitation from aqueous solution and the magnesium oxide which is obtained by the burning of magnesium ribbon, do not keep their original whiteness but yellow and smudge within a short time and must then be discarded and replaced. For this reason, much time and effort has been spent in the search for materials with good keeping qualities which could be used as reflectance secondary standards or references. These secondary or substitute standards are also sometimes referred to colloquially as "substandards." Heretofore, blocks and opaque glass such as white Vitrolite or of white Carrara were used as secondary standards for measuring reflectance. However, these materials were not wholly satisfactory because the Vitrolite and the Carrara had poor spectral neutrality and reflectivity characteristics and were far too dark to permit accurate measurements of white, highly reflective surfaces. Blocks of magnesium carbonate and magnesium oxide were equally unsatisfactory because they had poor physical properties with regard to stress and strain. Besides, their surfaces yellowed far too rapidly, so that these standards become worthless after short use.

It is, accordingly, an important object of this invention to provide secondary standards or references for use in measuring reflectance which will be free from the foregoing disadvantages and which will be substantially permanent and of exceptional strength.

These and other objects and advantages which will appear from the following description of our invention are accomplished by producing a block of a highly light reflective pigment or filler and a clear binder and using this block as a secondary standard in the measurement of the light reflectance of a substance whose light reflectance is to be determined. Processes and apparatus using a substandard for measuring reflectance are well known in the art and need not be here described in detail. Our invention is applicable to any process or apparatus for measuring reflectance where a secondary standard or reference is used.

In a conventional process for measuring reflectance, a beam of light is directed onto a sample of the material, the reflectance of which is to be determined and onto a block of material having a known reflectance. This block is commonly referred to as standard, although frequently, a secondary standard is used. The amount of light reflected from each, the standard and the sample, is then measured and compared.

The light reflecting compound most commonly used in this art, and which we prefer to use, is magnesium carbonate ($MgCO_3$). However, other spectrally white compounds, such as, for instance, magnesium oxide, titanium dioxide and zinc oxide may be used.

Any clear binder which does not materially affect the reflecting properties of the reflecting compound may be used. Among them are resins derived from polystyrene, polyvinyl chloride and polyvinyl methacrylates. However, we have found that polymerized methyl methacrylate is especially suitable for our purpose since a block made with this binder has the excellent reflectivity of the pure reflective compound used, such as $MgCO_3$, and in addition has other desirable mechanical and surface properties imparted to it by this resin.

The composition comprising the reflective pigment or filler and binder may be molded into different sizes and shapes to serve as secondary and/or references in the many phases of reflectance measurements required for research and quality control. One of the shapes can be that of an integrating sphere used for collecting light in making diffuse measurements. In this instance, the sphere will have a permanent diffuse interior surface. Heretofore, such a sphere was made of metal or plastic devoid of a filler having diffuse properties, and the diffuse interior surface was imparted to the sphere by painting or by smoking with magnesium oxide.

The painted or smoked on surfaces of the prior art are not very durable and they must be replaced from time to time to maintain their efficiency. The interior surfaces of a sphere produced according to our process, on the other hand, being integral with the sphere do not deteriorate as readily as the surfaces of the prior art spheres and accordingly require substantially no maintenance.

If a surface which is completely diffuse is desired, such a surface can be imparted to the block or other shape by molding it in a mold having a face which is ground rather than polished. A block or other shape having a surface produced by a ground mold face has been found to be suitable as a reference for diffuse reflectance measurements of from 270 to 2,000 m$\mu$.

It is sometimes desirable, in the case of reflectance measurements, to have a series of spectrally neutral references at different density levels. This has been difficult to accomplish in the past. With our invention, this can be accomplished, by first using a reference made of black opaque material particularly black opaque glass such as the commercially available black Carrara or black Vitrolite as a high density reference (about 3.0 density) and the subsequent densities may then be obtained by placing or mounting magnesium carbonate-methyl methacrylate references of different thickness and/or concentrations on top of the black Carrara or black Vitrolite. In this manner, the proper balance between transmitted and reflected light can be obtained with the result that a wide variety of determinations of reflectance densities down to zero can be made.

Certain industries, as for example, those producing tile, fabric, etc., use colored pigments and dyes and it is essential to control the color of these pigments or dyes. Such pigments or dyes can, according to this invention, be incorporated into the methyl methacrylate, either with or without the magnesium carbonate and by a single or double molding operation. The references so produced provide lasting references for the dyes or pigments, the color of which is to be controlled.

The soap industry is now using brighteners and fluorescent materials in its super-white products, and there exists in this industry the problem of obtaining a proper reference for these products. According to this invention, a proper reference for use in connection with these brighteners and fluorescent materials may be obtained by molding predetermined thicknesses of methyl methacrylate containing a known concentration of the fluorescent material on top of a previously molded magnesium carbonate-methyl methacrylate block. The magnesium carbonate will act as a neutral highly reflecting surface for the fluorescent compound. This, in turn, can be used as a permanent secondary standard and/or reference in determining the purity, efficiency and spectral qualities of the fluorescent compound as well as controlling the quality of products containing the fluorescent compound.

The secondary standard or reference of this invention is formed by mixing the white reflecting powder, such as magnesium carbonate, magnesium oxide, titanium dioxide or zinc oxide with methyl methacrylate polymer and hot molding the mixture to the desired shape. However, we have experienced great difficulty in obtaining a block having the reflecting powder sufficiently uniformly distributed throughout the polymer to meet the exacting requirements of a secondary standard or reference by using known techniques for obtaining uniform dispersions. Thus, when an attempt was made to mix a powder of any one of the compounds mentioned above with granulated methyl methacrylate polymer in the dry state and then hot molding the mixture under pressure, the resultant block had a pebble appearing surface and was not suitable for use as a secondary standard or reference in reflectance measurements.

Another known technique was then tried. Methyl methacrylate polymer was dissolved in acetone, the reflecting powder added, and the mixture stirred sufficiently to produce a good dispersion. Upon casting the mixture, however, it was found that the powder settled out of the solution leaving a clear layer of the polymer on top of the casting.

We have now discovered a new method of producing a block comprising a clear resin, such as polymerized methyl methacrylate, and a reflecting pigment or filler, preferably magnesium carbonate in which the reflecting pigment is so uniformly dispersed in the block as to meet the exacting requirements of a secondary standard or reference. Our process comprises dissolving from 5 to 20 parts by weight of the polymer in from 10 to 50 parts by volume of solvent, such as acetone for example, adding from 5 to 80 parts by weight of the finely ground pigment and stirring sufficiently to produce a uniform dispersion of the pigment in the solution, and while the pigment is thus uniformly dispersed, slowly pouring the mixture into hot water having a temperature between 70 and 90° C. The hot water immediately coagulates the resin which in turn retains the filler in uniform dispersion. The coagulated material is then removed from the water, dried, ground into a powder and pressure molded into the desired shape by subjecting it to a pressure ranging from 500 to 1,500 p.s.i. and at a temperature ranging from 105° C. to 150° C. for a period of from 5 to 25 minutes. The materials thus obtained are suitable as a reference for reflectance measurements in a range extending from 270 m$\mu$ to 2,00 m$\mu$.

The following specific example of a process for the production of a block shaped material suitable for use as a secondary standard and/or reference is given. It is to be understood, however, that this example is given by way of illustration only and not by way of limitation.

Example

A quantity of magnesium carbonate was ground sufficiently fine to pass through a 100 mesh stainless steel screen. Methyl methacrylate polymer (Du Pont "Lucite" powder 29 acrylic resin NC–ID) was then dissolved in acetone in the ratio of 10 grams of resin per 20 milliliters of solvent. The ground magnesium carbonate was then added to the resin solution in the ratio of approximately 6 parts of magnesium carbonate to 5 parts of solution and the mixture stirred until the magnesium carbonate was uniformly dispersed in the solution, and while so uniformly dispersed, the mixture was slowly poured into hot water having a temperature of approximately 80° C. The mixture coagulated and the coagulated mass was removed from the water and placed in a moderately hot oven, heated to approximately 100° C. to drive off any acetone and water present in the mass.

After drying, the mass was ground into a powder, placed in a mold and molded under pressure of 1,000 p.s.i. and a temperature of 125° C. The pressure and temperature were maintained for approximately 15 minutes after which the mold was allowed to cool and the article thus produced removed from the mold. The molded article was found to have the magnesium carbonate sufficiently uniformly dispersed therein to be suitable for use as a secondary standard in measuring reflectance.

The reflectance properties of a secondary standard made from equal parts of the materials thus prepared are about equal to those of a primary standard. Measurements show that the secondary standard of the example has a reflectance ranging from approximately 97.5% at 400 m$\mu$ to 99% at 750 m$\mu$ relative to that of pure freshly prepared magnesium carbonate. The substandard made according to our invention had a strength 100 times greater than a similar secondary standard made from pure magnesium carbonate as determined by a breakage test. Even after several months of use, the secondary standard maintained the above reflectivity when compared with freshly prepared pure magnesium carbonate.

Many obvious modifications may be made in our invention. Our invention, accordingly, is not limited by the detailed description given above except as defined by the appended claims.

We claim:

1. A process for producing a body which can be used as a secondary standard for reflectance measurement which comprises uniformly dispersing a white pigment selected from the class consisting of titanium dioxide, zinc oxide, magnesium oxide and magnesium carbonate in a viscous non-aqueous solution of clear water insoluble methyl methacrylate polymer in a solvent therefor, pouring the solution into hot water to coagulate the resin, drying the resulting coagulated product which contains the magnesium carbonate dispersed in said polymer, grinding the dried product to a powder and pressure molding the powder into the desired shape of said body.

2. A process as recited in claim 1, wherein said solvent is acetone.

3. A process for producing a body comprising a methyl methacrylate polymer and magnesium carbonate uniformly dispersed therein which comprises dissolving from 5 to 20 parts by weight of said polymer in from 10 to 50 parts by volume of acetone to form a viscous solution, uniformly dispersing the magnesium carbonatae therein, pouring the solution into hot water to coagulate the polymer, drying the resultant dispersion of magnesium carbonate in the resin, grinding the dried product into a powder and pressure molding it into the desired shape at a pressure ranging from 500 to 1,500 p.s.i. at a temperature ranging from 105° to 150° C.

4. A process according to claim 1 wherein the desired shape of said body is the shape of a secondary standard for reflectance measurements.

References Cited

UNITED STATES PATENTS

| | | | |
|---|---|---|---|
| 2,879,247 | 3/1959 | Bradford et al. | 264—331 |
| 2,972,170 | 2/1961 | Brickhead et al. | 264—331 |
| 2,444,059 | 6/1948 | Neher et al. | 161—254 |
| 2,456,467 | 12/1948 | Swedlow | 161—254 |
| 2,045,651 | 6/1936 | Hill | 264—331 |
| 2,120,006 | .6/1938 | Strain | 264—331 |
| 2,238,446 | 4/1941 | Kuettel | 264—331 |
| 2,875,076 | 2/1959 | Suchow | 106—193 |
| 3,215,663 | 11/1965 | Weisberg | 260—41 |

ALLAN LIEBERMAN, *Primary Examiner.*

U.S. Cl. X.R.

260—41; 264—331